United States Patent [19]

Rand

[11] Patent Number: 5,271,025
[45] Date of Patent: Dec. 14, 1993

[54] MODE-LOCKED UPCONVERSION LASER SOURCE

[75] Inventor: Stephen C. Rand, Ann Arbor, Mich.

[73] Assignee: University of Michigan, Ann Arbor, Mich.

[21] Appl. No.: 926,058

[22] Filed: Aug. 5, 1992

[51] Int. Cl.$^5$ .......................... H01S 3/09; H01S 3/098
[52] U.S. Cl. ........................................ 372/18; 372/13; 372/20; 372/41; 372/42; 372/69; 372/70
[58] Field of Search ...................... 372/18, 13, 20, 69, 372/70, 71, 72, 41, 42

[56] References Cited

U.S. PATENT DOCUMENTS

| | | | |
|---|---|---|---|
| 4,782,494 | 11/1988 | Pollack et al. | 372/69 |
| 4,990,322 | 2/1991 | Pollock et al. | 372/42 |
| 4,995,046 | 2/1991 | Fan et al. | 372/41 |
| 5,008,890 | 4/1991 | McFarlane | 372/41 |
| 5,014,279 | 5/1991 | Esterowitz et al. | 372/41 |
| 5,022,040 | 6/1991 | Pollack et al. | 372/69 |
| 5,038,358 | 8/1991 | Rand | 372/69 |
| 5,054,027 | 10/1991 | Goodberlet et al. | 372/18 |
| 5,157,677 | 10/1992 | Narhi et al. | 372/20 |

Primary Examiner—Georgia Y. Epps
Attorney, Agent, or Firm—Rohm & Monsanto

[57] ABSTRACT

A laser source which operated under the principals of cooperative upconversion produces controllable optical pulses at wavelengths which are shorter than the wavelength of the laser energy which pumps the gain medium. The source is a solid-state laser which employs a five percent Er:LiYF$_4$ crystal which is arranged in an astigmatically-compensated 3-mirror cavity. Pumping is achieved at 1.5 microns in the infrared, and the system operates in a continuous-wave, mode-locked fashion in the green spectral region at approximately 544 nm. The cooperative inversion mechanism involves energy pooling by trios of excited rare earth dopant ions in the laser medium. Q-switching is achieved with the use of intracavity amplitude modulation so as to achieve threefold upconversion. A 3-mirror astigmatically-compensated cavity with the gain medium permits modulation of losses in a manner which cannot be achieved with known systems and achieves high stability.

15 Claims, 4 Drawing Sheets

MODE-LOCKED UPCONVERSION LASER SOURCE

RIGHTS OF THE UNITED STATES GOVERNMENT

This invention was made with government support under grant no. AFOSR-91-0369 awarded by the Air Force Office of Scientific Research. The government has certain rights in the invention.

RELATIONSHIP TO PATENT

The subject matter of this invention is related to U.S. Pat. No. 5,038,358 which issued on Aug. 6, 1991 to the same inventor as herein and which is assigned to the same assignee as herein. The entirety of that issued patent is incorporated herein by reference.

BACKGROUND OF THE INVENTION

1. Field of the Invention

This invention relates generally to upconversion laser systems, and more particularly, to a solid-state, continuous-wave, mode-locked laser system which produces output pulses at wavelengths significantly shorter than the pumping energy by energy pooling by trios of excited rare earth dopants.

2. Description of the Prior Art

A continuing challenge in ultrafast technology is the need for pulsed optical sources at short wavelengths for spectroscopy, communications, and metrology. There are currently no continuously mode-locked laser sources available at wavelengths shorter than that of the Argon ion laser at 458 nm. Continuous-wave (cw) mode-locked dye lasers operate only to ~500 nm and solid state sources exist only at wavelengths longer than approximately 700 nm. Considerable research effort has therefore been directed to extending operation of short pulse infrared sources like the Ti:sapphire laser to shorter wavelengths through nonlinear harmonic generation. Also, widegap semiconductor lasers are under development. However, there have been no reports of mode-locking of short wavelength solid state lasers. Despite many desirable properties, solid state lasers typically operate at photon energies far below bandgap and suffer deleterious color center formation when short wavelength optical excitation is used. It is, therefore, no coincidence that even conventional optically-pumped, cw solid state lasers have not been demonstrated at short wavelengths.

Upconversion lasers, emitting at wavelengths shorter than their excitation, potentially avoid shortcomings of above-bandgap excitation of solid state media. It is, therefore, perhaps not too surprising that the first continuous-wave ultraviolet solid state laser was a Nd upconversion laser, illustrating the utility of long wavelength pumping. Recently, other upconversion lasers have been operated in the visible spectral region on the basis of cooperative upconversion and avalanche upconversion, and room temperature operation has been achieved in fibers and $BaYYb_{0.99}Tm_{0.01}F_8$ crystals.

Currently there is interest in developing compact, short-wavelength laser sources for display and data storage applications. Widegap semiconductor diode lasers, harmonic generation by phase-matching or quasi-phase-matching, and upconversion lasers in bulk media and fibers are three promising approaches. However, widegap semiconductors present growth and doping problems which to date have prevented room temperature operation by current injection. Harmonic generation requires critical alignment in bulk crystals and suffers reduced efficiencies in fibers and slab waveguides. Upconversion lasers depend on complex internal dynamics to upgrade photon energy by mechanisms which are themselves still the subject of intense inquiry. Hence, many questions remain to be answered before the limitations of these various approaches can be fully assessed.

Initial upconversion laser research revealed low efficiencies and requirements for liquid helium cryogenics. However, many different mechanisms of upconversion exist and high efficiency, high temperature continuous operation is undoubtedly achievable in suitable media with appropriate techniques. To date, high efficiency and room temperature operation have only been demonstrated under separate circumstances in selected laser crystals and fibers, respectively.

It is, therefore, an object of this invention to provide a laser source which produces controllable optical pulses at wavelengths shorter than that used to pump the gain medium.

It is another object of this invention to provide a laser source which operates in a continuous-wave mode to produce controllable optical pulses at wavelengths shorter than that used to pump the gain medium.

It is also an object of this invention to provide an upconversion laser source which can operate efficiently near room temperature.

It is a further object of this invention to provide an upconversion laser source which produces controllable optical pulses by a cooperative process involving energy pooling of trios of excited rare earth dopant ions in a laser medium.

It is additionally an object of this invention to provide a solid-state laser system which directly emits mode-locked pulses at short wavelengths.

It is yet a further object of this invention to provide a solid-state laser system which employs a cooperative inversion mechanism and provides greater reliability operating in pulsed mode than can be expected from alternative upconversion mechanisms.

It is also another object of this invention to provide a solid-state upconversion laser system which operates in continuous-wave, mode-locked fashion, in the green spectral region.

It is yet an additional object of this invention to provide a mode-locked, short-wavelength, solid-state laser.

It is still another object of this invention to provide a mode-locked, short-wavelength, solid-state laser which does not exhibit spiking during continuous-wave operation.

It is a yet further object of this invention to provide a mode-locked, short-wavelength, Q-switched laser.

SUMMARY OF THE INVENTION

The foregoing and other objects are achieved by this invention which provides a solid state laser system which is provided with an astigmatically compensated cavity having first and second mirrors therein which serve to control focusing. A third mirror is arranged outside of the astigmatically compensated cavity, and serves as the output mirror. The solid state laser is further provided with a gain medium formed of $Er:LiYF_4$ arranged within the astigmatically compensated cavity. Q-switched operation is achieved by controlling an acousto-optic modulator which is arranged in the vicinity of the third mirror. A laser pump is arranged to supply a pumping energy to the gain medium.

In one embodiment of the invention, the first and second mirrors of the laser system are curved at a predetermined radius. In a practical embodiment, such radius is on the order of approximately five centimeters.

The solid-state laser of the present invention is provided with a Brewster-angle, standing-wave modulator arranged in the cavity for effecting mode-locked operation of the system. This is achieved, in certain embodiments, by a standing-wave modulator in the cavity near the output mirror, and by adjustment of the cavity length.

The gain medium is a three millimeter thick crystal of five percent $Er:LiYF_4$ which is arranged to have an optical axis parallel to the crystal surface. This crystal receives the pumping energy which is provided, in certain embodiments, by a continuous-wave NaCl color center laser. In a highly advantageous embodiment of the invention, the continuous-wave NaCl color center laser is arranged to provide a resonant excitation of the $4I_{13/2}$ level of $Er^{3+}$ at 1.5 microns.

In accordance wth a method aspect of the invention, optical pulses of a predetermined short wavelength are produced by the method having the steps of:

pumping a laser gain medium contained within a laser cavity with a continuous-wave laser energy having a longer wavelength than the predetermined short wavelength;

controlling an acousto-optic modulator to effect Q-switched operation; and selecting a working frequency to maintain a stable upconversion laser cavity.

In certain embodiments of this method aspect of the invention, there is provided the further step of tuning the continuous-wave laser energy. This is achieved by tuning a continuous-wave NaCl color-center laser. The laser energy is preferably provided in a single transverse mode.

In further embodiments of the invention, the length of the laser cavity is adjusted. Additionally, the working frequency of the laser is selected by translating an output coupler to achieve a round-trip time which matches a second-harmonic period of the acousto-optic modulator.

BRIEF DESCRIPTION OF THE DRAWING

Comprehension of the invention is facilitated by reading the following detailed description, in conjunction with the annexed drawing, in which.

DETAILED DESCRIPTION

The cooperative upconversion laser on which this invention is based attains three-fold upconversion of pump photon energy and continuous-wave emission in the green spectral region with 12% slope efficiency at temperatures as high as 95° K. In this device, inversion is due entirely to an "energy-pooling" process involving three atoms, very similar in nature to the operating principle of a monolithic $Er:CaF_2$ trio laser described in U.S. Pat. No. 5,038,358. By introducing a 3-mirror, astigmatically-compensated cavity with $Er:LiYF_4$ as the gain medium, we have been able to modulate losses in a fashion not possible in the original trio laser and find this laser offers exceptional stability for mode-locking applications in comparison to earlier green Er upconversion lasers.

Figure 1:
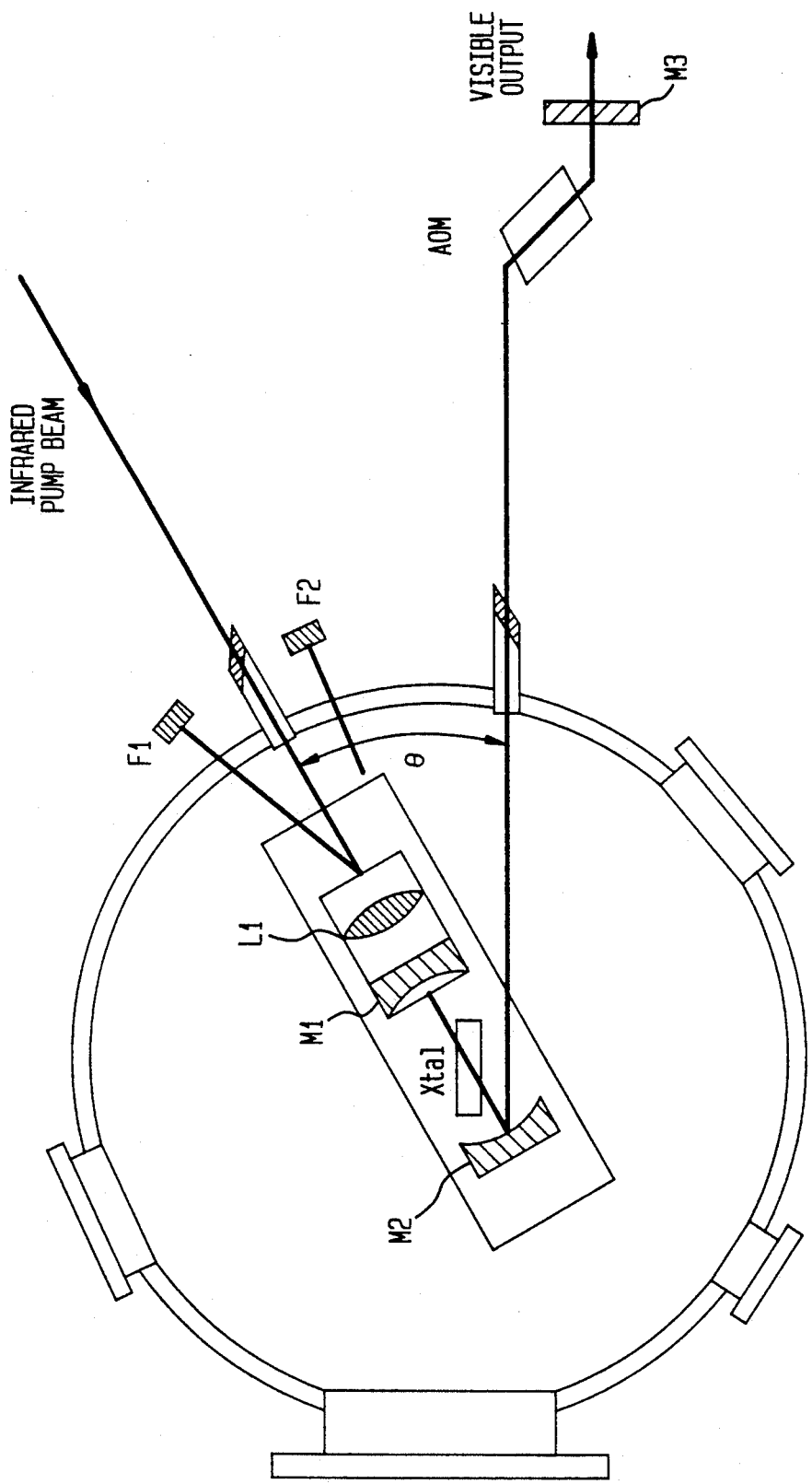
FIG. 1 is a simplified schematic representation of an experimental apparatus which functions in accordance with the principals of the invention.

An experimental apparatus which functions as an astigmatically-corrected, 3-mirror upconversion laser cavity is shown in FIG. 1. The Brewster-oriented ($\theta_B = 55.6°$) gain medium in the present experiment consisted of a 3 mm thick crystal of 5% $Er:LiYF_4$ with its optic axis parallel to the crystal surface, in the plane of incidence of the horizontally polarized pump field. This orientation permits gain extraction on both $\pi$ and $\sigma$ polarized transitions. In this embodiment, the $Er:LiYF_4$ crystal was suspended on a cold finger (not shown) at the center of the cavity of a vacuum chamber. A tunable, cw NaCl color center laser provided resonant excitation of individual $4I_{13/2}$ Stark levels of $Er^{3+}$ near 1.500 $\mu$m, and an inter-arm angle of $\theta = 26.2°$ compensated for astigmatism introduced by the two 5 cm radius curved mirrors at the output wavelength of 544 nm.

Figure 2A:
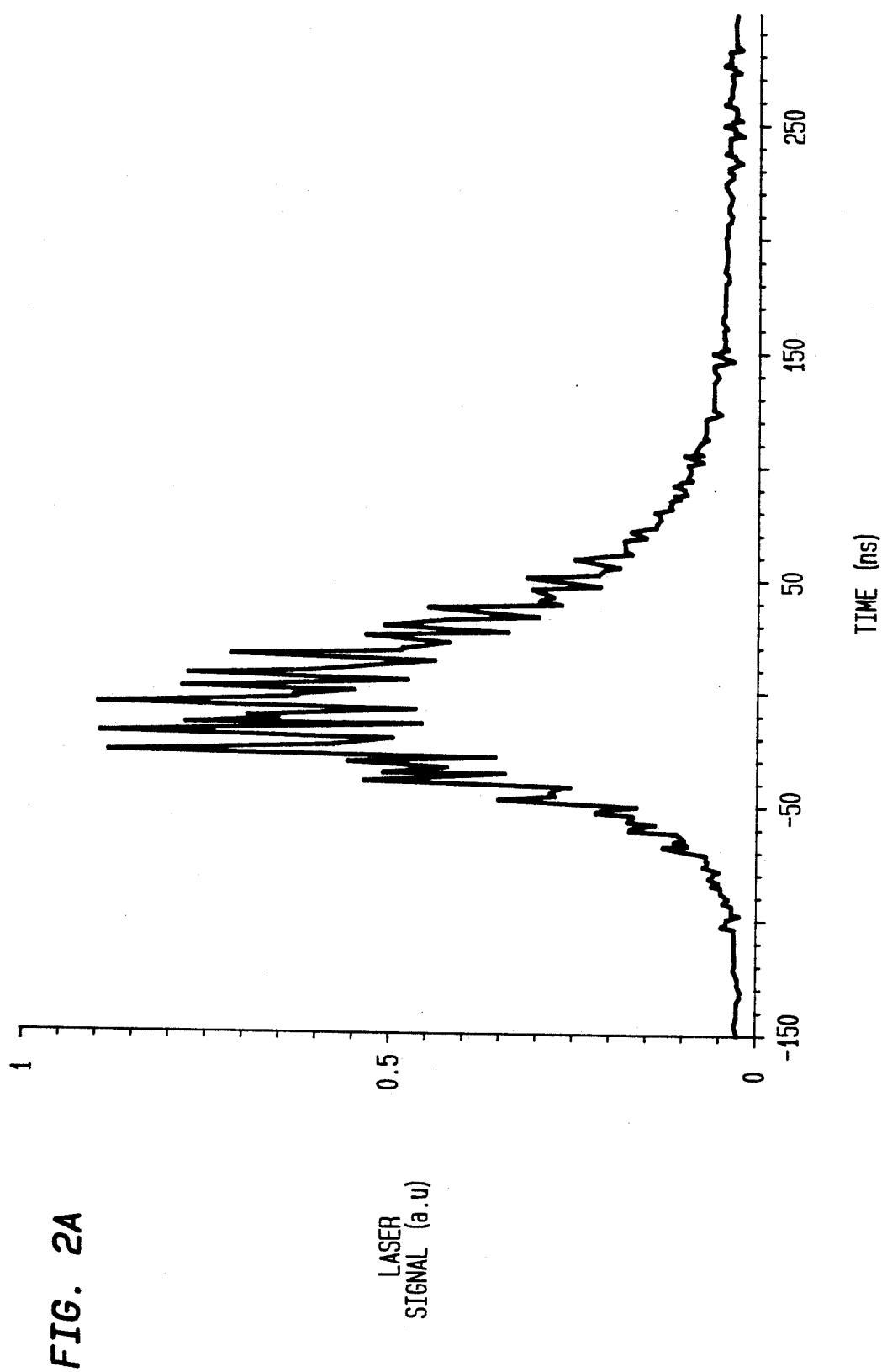
FIG. 2A is a graphical representation which illustrates the relationship between (Q-Switched) laser signal output power, in arbitrary units, versus time, in nanoseconds.
Figure 2B:
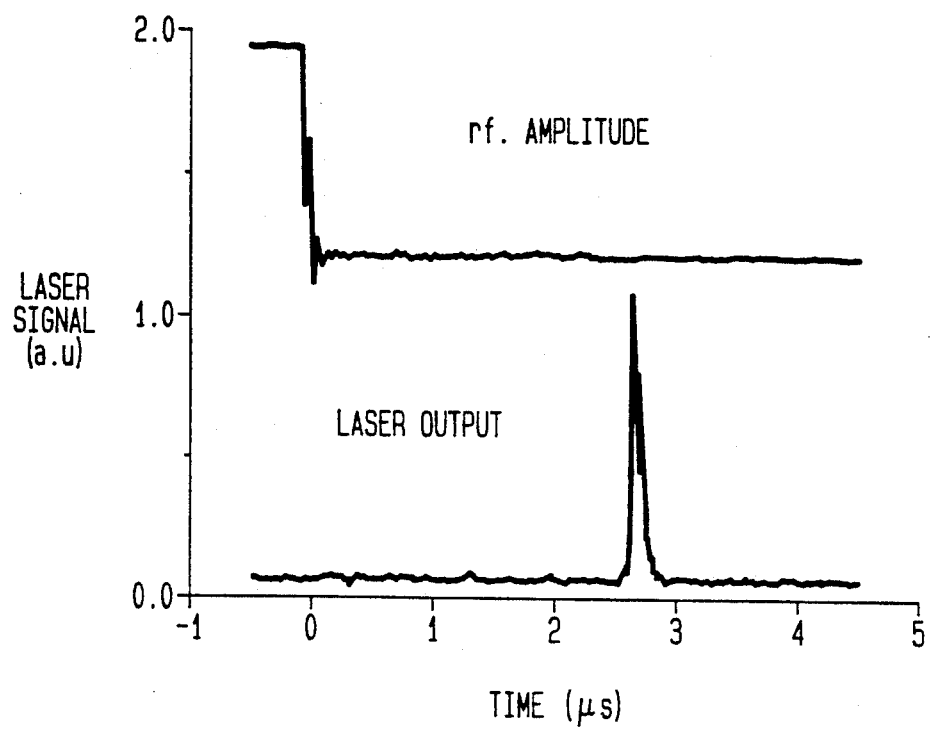
FIG. 2B is a graphical representation which illustrates a switching pulse sequence applied to the rf gate of the modulator driver and the relative timing of the output pulse.
Figure 3:
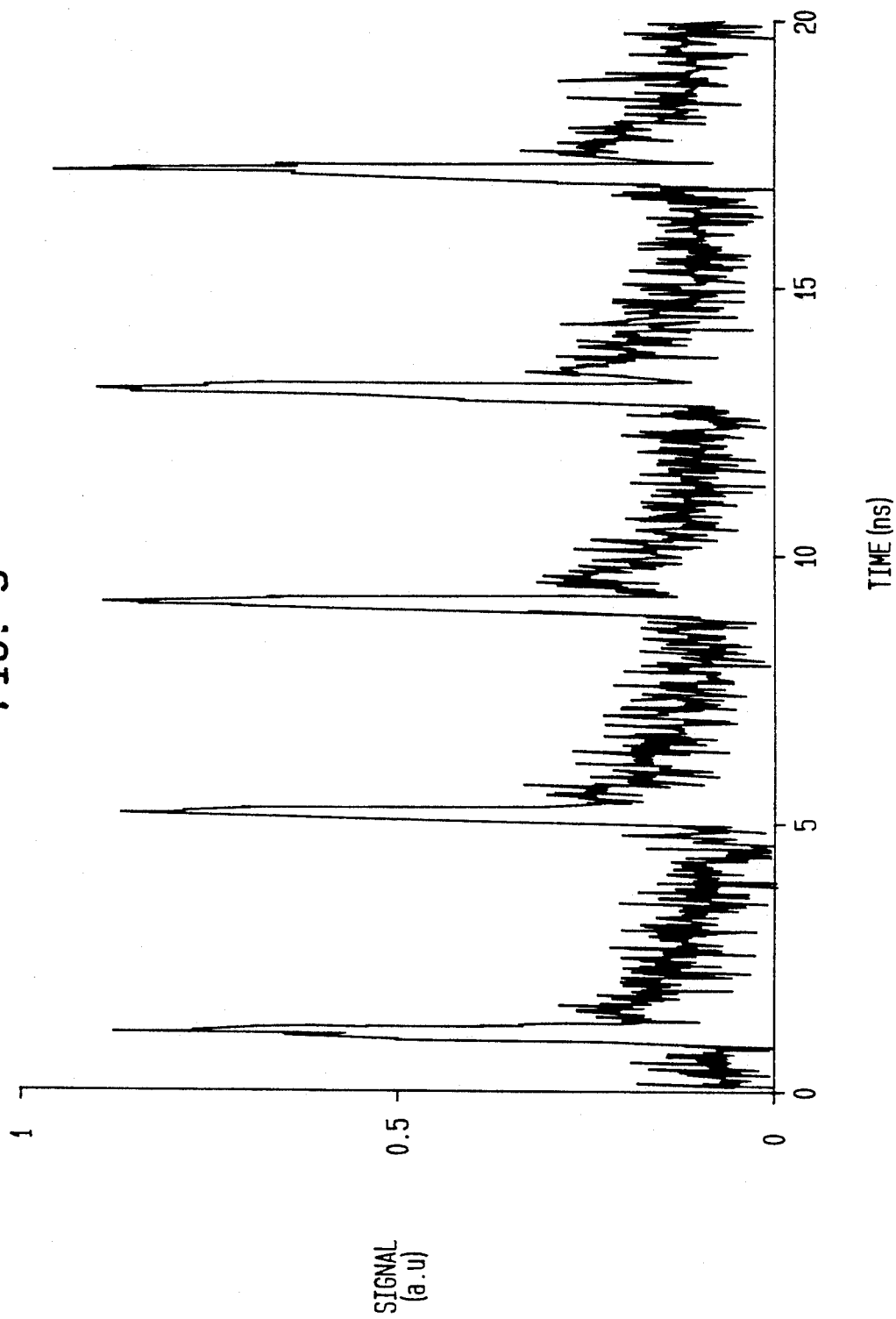
FIG. 3 is a graphical representation which illustrates (mode-locked) the output signal of the apparatus constructed in accordance with the invention plotted against time in nanoseconds.

Q-switched operation was achieved using a solid state switch to control the amplitude of 80 MHz rf delivered to the driver amplifier of an AR-coated acousto-optic modulator. Square pulses with a repetition rate of 1 kHz and an on/off duty cycle of 12/1 furnished an emergency storage cycle of 920 $\mu$s, approaching the lifetime of the $4I_{13/1}$ state (13.9 ms) and a switch-out period of 80 $\mu$s. The cw pump laser was operated in a single transverse mode, with multiple longitudinal modes. Typically, Q-switched pulses of 0.6 $\mu$J energy and 50 ns duration were obtained for a cw pumping power of 600 mW. Peak output power was 9 Watts. FIG. 2A is a graphical representation of Q-switched, upconversion laser signal output power (0.5440 $\mu$m), in arbitrary units, versus time, in nanoseconds at 9° K. FIG. 2B shows the switching pulse sequence applied to the rf gate of the modulator driver and the relative timing of the output pulse Mode-locked operation was achieved by insertion of a Brewster-angle, standing-wave modulator in the cavity near the output mirror, and adjustment of cavity length. The acoustic resonant frequency was 60.016±n×1.967 MHz. A working frequency of 119.044 MHz (n=30) was chosen to maintain a short, stable upconversion laser cavity. The output coupler was carefully translated parallel to the cavity axis until the cavity round trip time matched the second harmonic period (4.2 ns), at a cavity length of approximately 60 cm. An Intel photodiode was mounted on the SD-24 sampling head of a 20 GHz Tektronix 11802 digital oscilloscope to monitor the output waveform in real time. Results are shown in FIG. 3 which is a graphical representation of mode-locked output signal power in arbitrary units plotted against time in nanoseconds at 0.5440 μm for an infrared pump power at 1.5 μm of 120 mW focused to a spot of radius 18 μm in the gain medium.

Figure 4:
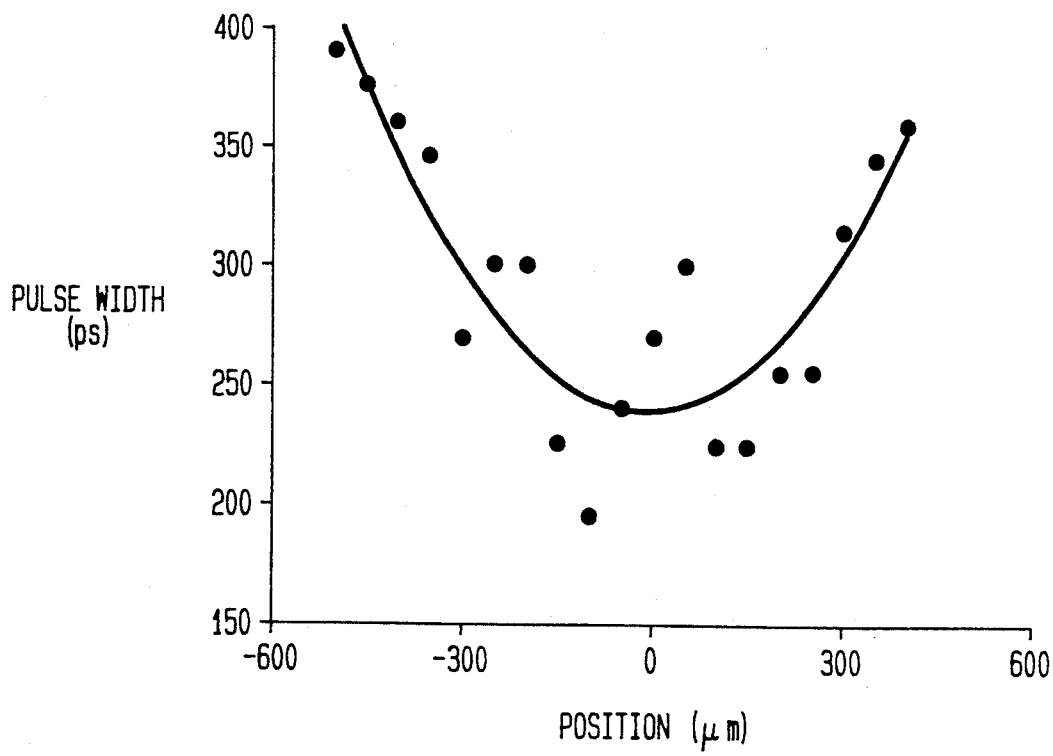
FIG. 4 is a graphical representation which illustrates mode-locked pulsewidth plotted against position of an output coupler with a best fit curve generated by quadratic regression.

Pulse formation was very sensitive to cavity length adjustments. The shortest pulses were initiated only within ~50 microns of the synchronous length as shown in FIG. 4. FIG. 4 is a graphical representation of mode-locked pulsewidth in picoseconds versus position of the output coupler.

The output pulse train consisted of ~200 ps pulses spaced by the round trip time of 4.2 ns. Bandwidth limitations of the optical sampling and detector accounted for 50 and 45 ps (FWHM) respectively, hence the averaged traces furnished a direct upper limit on optical pulse width of ~180 ps after Gaussian deconvolution. Since an undetermined portion of this width was due to sampling jitter associated with the sine wave signal used to trigger the scope, optical autocorrelation measurements would be useful to determine the pulse width more precisely. The inhomogeneous bandwidth of the upconversion laser transition is not known at present, hence a direct comparison between pulse and transition bandwidths cannot be made at this time. However, the observed pulsewidths are consistent with inhomogeneous broadening in excess of 5 GHz, typical of rare earth transitions in crystalline media at low temperatures, and no dependence on modulation depth was observed above the onset of mode-locking with only 400 mW rf input at 9° K. Shorter mode-locked upconversion laser pulses can undoubtedly be achieved with homogeneous mode-locking in Er:LiYF$_4$ at higher temperatures or in glass hosts. Upconversion fiber lasers should be particularly well-suited to the direct generation of visible and ultraviolet pulses as short as a few picoseconds at room temperature.

The present mode-locker was designed for use at 1.06 μm, and exhibited high insertion loss at visible wavelengths. The optical pumping threshold for mode-locking was 250 mW, compared to 25 mW for cw operation. Similarly, a maximum average output of 2 mW was obtained in the mode-locked condition, compared to 20 mW in cw operation with the same 2% output coupler and 450 mW of incident pump power. Maximum operating temperature also dropped to 15° K. from 95° K. upon insertion of the modulator. Performance can be expected to improve significantly by careful design of the modulator for the upconversion application.

Excitation of any Erbium absorption line in the range 1.45–1.55 μm resulted in laser output at $\lambda = 0.5440 \mu$ at 10° K. This emission wavelength corresponds to the $^4S_{3/2}(1) - ^4I_{15/2}(4)$ transition with mixed $\sigma$, $\pi$ polarization due to Kramers degeneracy, terminating in the fourth $^4I_{15/2}$ Stark level from the bottom of the manifold, 400 cm$^{-1}$ above the true ground state. The spectrum of laser excitation reveals all seven $^4I_{15/2}(1) - ^4I_{13/2}(n)$ Stark components, confirming that mode-locking results from pumping into any $^4I_{13/2}$ level at this temperature. At temperatures above 15° K., the laser wavelength changed to $\lambda = 0.5516$ μm.

An interesting advantage of the trio laser over earlier green Er upconversion lasers for mode-locking purposes is its operational stability in cw mode. Continuous operation without spiking is obtained with the cooperative upconversion laser under all pumping conditions. This contrasts sharply with self-pulsing observed on the 551 nm transition in Er:LiYF$_4$ when alternate excitation methods are used, behavior which has been linked to excited state absorption from the $^4I_{13/2}$ level. Since the cooperative trio process relies on significant occupation of the $^4I_{13/2}$ level, this difference in behavior cannot result from the absence of self-absorption. Rather, steady output must arise from inherently sluggish response of the cooperative upconversion mechanism to changes in intracavity photon density, compared to faster response times of multiphoton absorption mechanisms operative in other upconversion lasers. This appears to be essential in preventing uncontrolled, self Q-switching at this wavelength in LiYF$_4$.

In summary, controlled Q-switching and active mode-locking of a cooperative upconversion laser with an open cavity configuration has been demonstrated. Pulses of less than 200 ps duration have been generated directly in the green spectral region using cw pumping in the mid infrared. From the present results, and our earlier time-resolved spectroscopy which revealed that excitation mechanisms other than cooperative upconversion contribute negligibly to the inversion of this trio laser, it may be concluded that efficient, cw mode-locked upconversion laser operation can be sustained at short wavelengths by spontaneous trio interactions alone. Cooperative pumping apparently stabilizes the inversion against self Q-switching, permits surprisingly efficient operation to temperatures as high as 95° K. and should permit direct generation of cw mode-locked picosecond pulses at much shorter wavelengths in this and other rare-earth solids.

Although the invention has been described in terms of specific embodiments and applications, persons skilled in the art can, in light of this teaching, generate additional embodiments without exceeding the scope or departing from the spirit of the claimed invention. Accordingly, it is to be understood that the drawing and description in this disclosure are proffered to facilitate comprehension of the invention, and should not be construed to limit the scope thereof.

What is claimed is:

1. A solid-state laser system comprising:
   an astigmatically compensated cavity containing first and second mirrors;
   a third mirror arranged outside of said astigmatically compensated cavity;
   a gain medium formed of Er:LiYF$_4$ arranged within said astigmatically compensated cavity;
   acousto-optic modulator means arranged in the vicinity of said third mirror for effecting Q-switched operation of the solid-state laser system; and
   pumping means for supplying a pumping energy to said gain medium.

2. The solid-state laser system of claim 1 wherein said first and second mirrors of said astigmatically compensated cavity are each curved at a predetermined radius.

3. The solid-state laser system of claim 2 wherein said predetermined radius is approximately 5 cm.

4. The solid-state laser system of claim 1 wherein there is further provided switch means for controlling an amplitude characteristic of a radio-frequency energy provided to said acousto-optic modulator means.

5. The solid-state laser system of claim 1 wherein there is provided a Brewster-angle, standing-wave modulator arranged in said cavity for effecting mode-locked operation of the solid-state laser system.

6. The solid-state laser system of claim 1 wherein said gain medium is a 3 mm thick crystal of 5% Er:LiYF$_4$ arranged to have an optical axis parallel to a crystal surface.

7. The solid-state laser system of claim 1 wherein said pumping means comprises a continuous-wave NaCl color-center laser.

8. The solid-state laser system of claim 6 wherein said continuous-wave NaCl color-center laser is arranged to provide resonant excitation of the $^4I_{13/2}$ level of $Er^{3+}$ at 1.55 μm.

9. A method of producing optical pulses at a predetermined short wavelength, the method comprising the steps of:

pumping a laser gain medium contained within a laser cavity with a continuous-wave laser energy having a longer wavelength than the predetermined short wavelength;

controlling an acousto-optic modulator to effect Q-switched operation; and selecting a working frequency to maintain a stable upconversion laser cavity.

10. The method of claim 9 wherein there is provided the further step of tuning said continuous-wave laser energy.

11. The method of claim 9 wherein said step of tuning comprises the further step of tuning a continuous-wave NaCl color-center laser.

12. The method of claim 9 wherein said step of pumping comprises the further step of pumping a $Er:LiYF_4$ laser crystal.

13. The method of claim 9 wherein said step of pumping comprises the further step of providing said continuous-wave laser energy in a single transverse mode.

14. The method of claim 9 wherein there is further provided the step of adjusting a length of the laser cavity.

15. The method of claim 9 wherein said step of selecting the working frequency comprises the step of translating an output coupler to achieve a round-trip time which matches a second-harmonic period.

* * * * *